May 15, 1945.   C. R. SACCHINI ET AL   2,376,009
HYDRAULIC MOTOR MECHANISM
Filed April 7, 1943   2 Sheets—Sheet 1
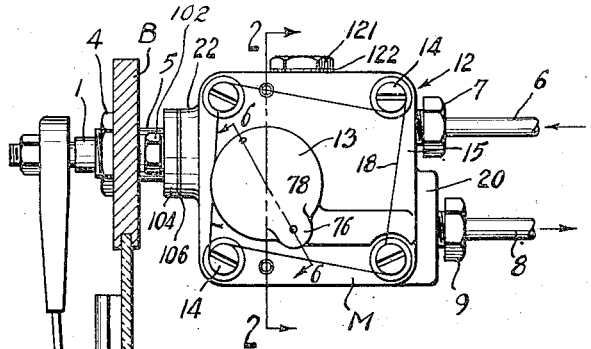
INVENTORS
COLUMBUS R. SACCHINI
LORAIN N. VANDERVOORT
BY George M. Soule
ATTORNEY

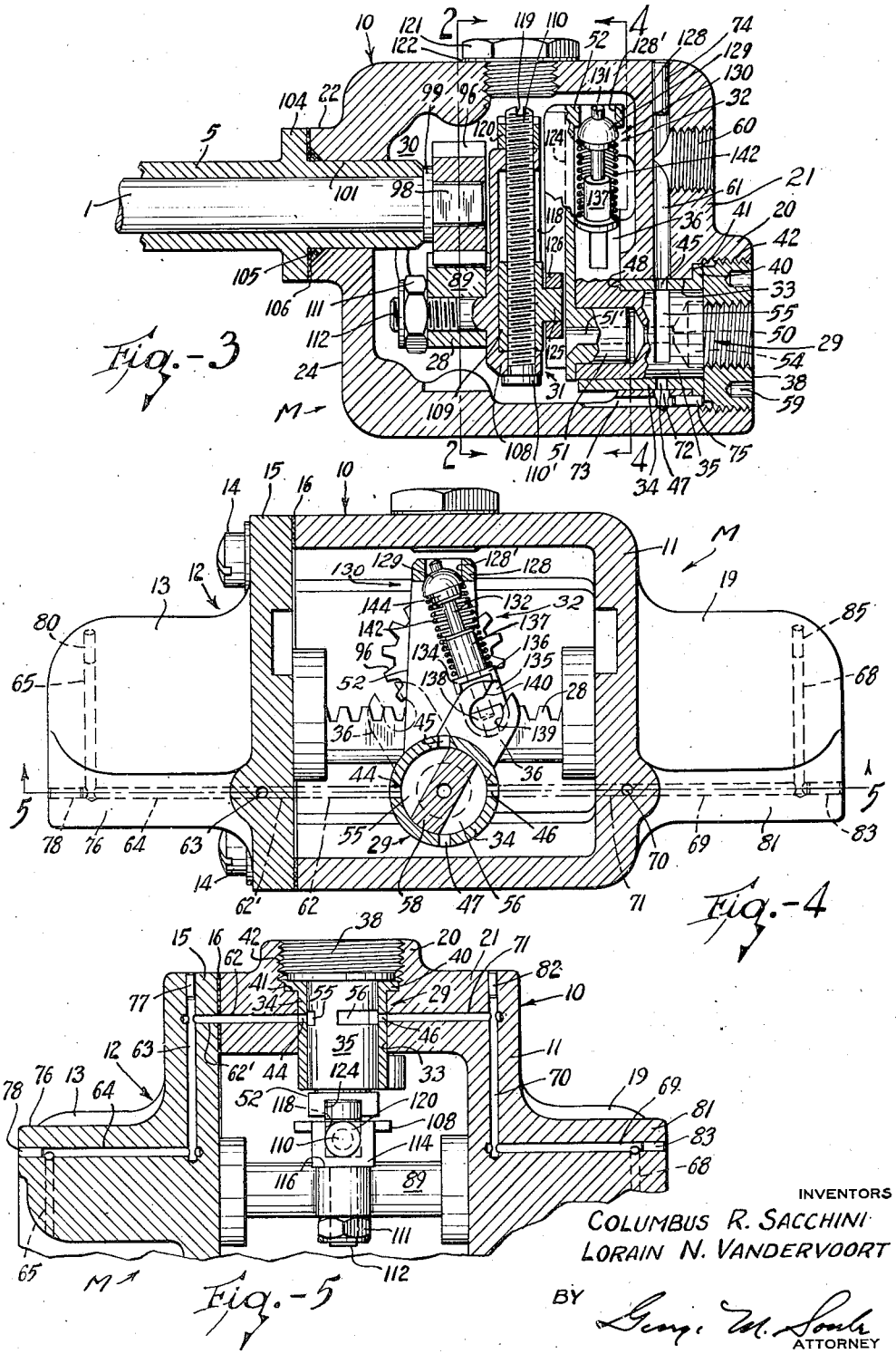
May 15, 1945.  C. R. SACCHINI ET AL  2,376,009
HYDRAULIC MOTOR MECHANISM
Filed April 7, 1943   2 Sheets-Sheet 2
INVENTORS
COLUMBUS R. SACCHINI
LORAIN N. VANDERVOORT
BY
ATTORNEY Patented May 15, 1945

2,376,009

UNITED STATES PATENT OFFICE 2,376,009

HYDRAULIC MOTOR MECHANISM

Columbus R. Sacchini, Euclid, and Lorain N. Vandervoort, Cleveland, Ohio, assignors to The Marquette Metal Products Company, Cleveland, Ohio, a corporation of Ohio Application April 7, 1943, Serial No. 482,124

7 Claims. (Cl. 121—164)

This invention relates to hydraulic motors and more particularly to hydraulic motors capable of producing alternate rotary motion of a power output shaft.

Although the motor of this invention is adapted to be employed in numerous different associations, it is primarily intended for use as a window or windshield wiper blade actuating mechanism, and the illustrative embodiment herein disclosed is described as applied to the most exacting of such uses, namely that of driving the windshield wiper blades on aircraft. Numerous mechanisms have been devised for actuating window and windshield wiper blades on aircraft by energy derived from fluid pumps or other fluid pressure sources currently provided on such craft for operating main navigational controls. Such prior arrangements have not been as satisfactory as desired because of their failure completely to overcome all of the many problems and to meet the exacting requirements of installations of this character.

Among these numerous problems are those of providing a rugged and dependable structure occupying a minimum of space and capable of operating for long periods without attention. The fluid motor must be capable of supplying adequate power to enable the wiper blades to clear the vision surface under adverse weather conditions unique in the operation of aircraft and under conditions presented by high velocity slip stream. Furthermore, it is essential that the fluid motor be manufactured from the light non-magnetic metals or alloys so as not to add to the non-pay load of the aircraft or interfere with the magnetic navigation instruments, and that provision be made for altering conveniently the extent of the sweep of the wiper blades.

The motion of the output shaft of many of the prior hydraulic motors designed to drive the blades of airplane window and windshield wipers has been rectilinear or push-pull in nature and consequently it has been necessary to provide motion converter units at the wiper blades to change the push-pull motion into alternate rotary motion. This additional equipment with its associated shafting has resulted in installations which occupy too much space and are of undue complexity. In addition, prior fluid motors have been provided with reciprocating slide valves which have numerous relatively sliding surfaces and are inherently complicated and therefore expensive and difficult to maintain in serviceable condition.

An object of the present invention is to provide an improved hydraulic motor.

A further general object is to provide a hydraulic motor which is of simple and rugged construction and comprised of a minimum number of parts which are simply and quickly assembled and disassembled for manufacturing and servicing purposes.

Another object is to provide a hydraulic motor adapted to drive a window or windshield wiper blade or blades which motor successfully meets all of the foregoing requirements and in which the disadvantages of most of the prior structures are eliminated.

Other general objects are to provide a device of the above indicated character which (1) is easy to manufacture in that it has a minimum of moving parts and required accurate machining is reduced to a minimum, (2) may be constructed without the use of iron or steel, (3) incorporates a rotary valve mechanism of simplified design, (4) the necessary fluid passages are easily provided, (5) the output shaft is positively driven with alternate rotary motion, (6) has a housing of simplified design, and (7) the extent of wiper blade movement is readily adjustable through a wide range in infinite steps.

A more specific object is to provide a hydraulic motor in which the power output shaft is driven with an alternate rotary motion in response to reciprocation of a piston controlled by a rotary valve actuated by a snap action mechanism.

Another specific object is to provide a hydraulic motor in which the extent of oscillation of a power output shaft is adjusted by varying the position of a pivot block with respect to the center of rotation of a trip yoke controlling the valve element of the motor.

Yet another specific object is to provide a snap acting rotary valve for a hydraulic motor in which a trip yoke for the valve is rotatably supported by the rotating valve element.

Another specific object is to provide improved fluid passage means in a hydraulic motor housing which permits controlled flow of the actuating fluid within the housing for lubricating purposes.

Other objects and advantages will become apparent from the following specification wherein reference is made to the accompanying drawings, in which:

Fig. 1 is a side elevation of the hydraulic motor of this invention shown in association with a typical windshield panel structure (latter shown in section) and arranged to drive a windshield wiper blade-supporting arm; Fig. 2 is a vertical sectional view taken generally on the line 2—2 of Fig. 1; Fig. 3 is a vertical sectional view taken generally on the line 3—3 of Fig. 2; Fig. 4 is a vertical sectional view taken generally on the line 4—4 of Fig. 3; Fig. 5 is a partial horizontal sectional view taken generally on the line 5—5 of Fig. 4; Fig. 6 is a partial vertical sectional view taken generally on the line 6—6 of Fig. 1; and Fig. 7 is a fragmentary view showing a detail of the yoke assembly.

In Fig. 1 the hydraulic motor M of this invention is shown mounted at the top of a representative airplane windshield panel A with its oscillatable power output shaft 1 extending through framework B of the panel to actuate a wiper blade mechanim 2 secured on the outer end of the shaft 1 so as to be driven thereby to effect oscillation of a wiper blade 3. The motor M may be fastened in position by means of a hex nut 4 threaded on the end of a bushing 5 which extends from the motor through the framework B and supports the shaft 1.

Fluid under high pressure from a suitable source (not shown) is supplied to the motor M through a high pressure conduit 6 attached to the motor by means of a suitable tube coupling 7, and low pressure exhaust fluid is carried away from the motor through a low pressure conduit 8 attached to the motor by means of a suitable tube coupling 9.

Although the hydraulic motor 8 is illustrated as driving but a single wiper blade 3, additional wiper blades could be operated from a single motor through the use of appropriate motion transmitting mechanism in a well known manner. The motor occupies but little more space than present electrically driven, speed reducing motion converter units, and, since an electric motor is not utilized, considerably less space is required for the complete windshield wiper blade driving mechanism. As shown, in Fig. 1, the use of the motor of this invention eliminates the need for auxiliary motion converter units such as are associated with the push-pull output shafting of the prior types of fluid motors, and it is apparent that the motor can be readily installed in any airplane with a minimum of interference and trouble.

Referring to the construction of the hydraulic motor M, a housing for the motor comprises a substantially cubical, hollow main body member 10 having an integral side wall 11 (Figs. 2 and 4) and an opposite open side closed by a cup-shaped head body member 12 having a central socketed portion 13 secured in position by suitable means such as cap screws 14 passing through openings in an integral, flange portion 15. The screws are received in complementary threaded sockets in corner portions of the walls of the body 10. A butt type joint between the flange 15 and the body 10 is suitably sealed against fluid leakage as by a compressible gasket 16, and (e. g. for aircraft use) the cap screws 14 may be secured against becoming loosened as by a suitable tie wire 18 passing through openings in respective heads of the screws 14.

The body 10 has a cup-shaped extension 19 projecting from the side wall 11 opposite the head body member 12, a hollow, generally cylindrical, extension 20 projecting from a rear wall 21, and a tubular extension 22 projecting from a front wall 24. The body members 10 and 12 are preferably cast from a suitable light, non-magnetic metal or alloy. When the body members 10 and 12 are in assembled position, the cup-shaped portions 13 and 19 of the respective body members are aligned at opposite sides of the motor M and define piston chambers 25 and 26, respectively, within which a double-ended piston 28 is adapted to reciprocate.

In addition to the piston 28, the operating mechanism of the motor M comprises, as indicated on Fig. 3, a rotary valve assembly 29, an output shaft driving rack and pinion assembly 30, a yoke assembly 31, and a snap action mechanism 32, all contained generally within the body 10.

As will be described more in detail hereinafter, the rotary valve assembly 29 is operable to direct fluid under high pressure from the high pressure inlet conduit 6 through suitable passages drilled or otherwise suitably formed in the walls of the body 10 and the head 12 alternately to the piston chambers 25 and 26 thereby to effect reciprocation of the piston 28. The piston, as a result of such reciprocation, drives the power output shaft 1 of the output shaft assembly 30 with an alternate rotary motion and operates the yoke assembly 31 which cooperates with the snap action mechanism 32 to effect properly timed operation of the rotary valve assembly 29. Exhaust fluid from the piston chambers 25 and 26 passes into the low pressure outlet conduit 8 under the control of the valve assembly 29 after the exhaust fluid has passed through the interior of the body 10 where it serves adequately to lubricate all of the moving parts, thus obviating the necessity for other special lubricating means.

As shown in Figs. 3, 4 and 5, the rotary valve assembly 29 is contained within an opening 33 which extends through the rear extension 20 of the body 10 into the interior of said body and comprises a flanged bushing 34, a cylindrical valve plug or gate element 35 rotatably supported by the bushing 34 in close fitting relation thereto, and an annular valve gate and bushing retainer and pressure outlet member 38. Said member 38 is in the form of a threaded sleeve which serves to support the outlet conduit 8 through the intermediary of a threaded coupling 9 screwed centrally into the member 38. The bushing 34 is pressed into the opening 33 with its flange 40 axially abutting an annular shoulder 41 defined by a threaded counterbore portion 42 of the opening 33. The bushing 34 has four ports 44, 45, 46 and 47 which, as shown in Fig. 4, are spaced equally about the periphery of the bushing.

The inner top end portion of the bushing 34 is cut away as at 48 (Fig. 3) to permit and limit oscillation of an integral bifurcated arm 36 of the valve gate 35 which is oscillatably driven through an arc of approximately sixty degrees by operative engagement of the arm 36 with the snap-action mechanism 32 as described later herein.

A central axial bore 50 through the gate 35 is counterbored at its inner end to enable the gate rotatably to receive and support a bearing pin 51 integral with a slotted trip yoke 52 which is part of the yoke assembly 31, and is counterbored at its outer end to define a chamber 54 communicating with the central opening in the retainer sleeve member 38 which, through the fitting 9, supports and communicates with the exhaust or outlet conduit 8. Diametrically opposed parallel tangential grooves in the gate 35, in the common plane of the ports 44, 45 46 and 47, terminate at chordal groove-bottom portions of the gate 35 to define with the bushing 34 a pair of valve chambers 55 and 56 separated by a generally rectangular central port-closing portion 58.

The valve gate and bushing retainer 38 may have suitable spanner wrench sockets 59 in its outer face and is screwed into the counterbored portion 42 of the opening 33 with its inner face operatively abutting the outer face portions of the bushing 34 and the valve gate 35. It is thus seen that the plug 38 absorbs the end thrust of the valve gate 35. The threaded joint between the sleeve 38 and the extension 20 may be sealed with a suitable plastic sealing compound during assembly.

When in the turned position illustrated in the drawings (Fig. 4) the valve gate 35 permits fluid to flow from the high pressure inlet conduit 6 (see Figs. 1 and 6) through a pipe threaded opening 60 in the wall 21, which opening receives the tube coupling 7, into a passage 61 and thence through the port 45 into the valve chamber 55. From the valve chamber 55 the high pressure fluid flows through the port 44 (Figs. 4 and 5) and passages 62, 62', 63, 64 and 65 to the outer end of the piston chamber 25. Concurrently, exhaust fluid is permitted to flow from the outer end of the piston chamber 26 through passages 68, 69, 70 and 71 and the port 46 into the valve chamber 56. As a result, the piston 28 is moved from left to right as viewed in Fig. 4. From the valve chamber 56 the exhaust fluid flows through the port 47 and the passages 72 and 73 into the interior of the body 10 where it serves to lubricate the moving parts. Displaced fluid flows from the interior of the body 10 through an axial bore 51' in the bearing pin 51 of the trip yoke 52 and the central bore 50 in the valve gate 35, aligned therewith, into the chamber 54 and thence through the low pressure outlet conduit 8.

When the valve gate 35 is turned to a position displaced approximately sixty degrees from the position shown in the drawings (new position of arm 36 indicated by dot and dash lines in Fig. 4 only) the fluid under high pressure from the inlet conduit 6 is directed by the valve assembly 29 into the outer end of the piston chamber 26 and the fluid is permitted to exhaust from the piston chamber 25. Consequently, the piston 28 then moves from right to left as viewed in Fig. 4 and completes a single cycle of operation.

Describing the internal fluid passages more in detail, the passage 61 (Fig. 3) is defined by a vertical bore in the end wall 21 extending across the opening 33 until it intersects a horizontal bore which defines the passage 73 in the bottom wall, the part of the bore of the passage 61 below the opening 33 defining the short passage 72. The outer ends of the passages 61 and 73 are sealed by suitable plugs 74 and 75, respectively, which may be screw threaded or pressed into the outer ends of the respective passages.

The passage 62 (Figs. 4 and 5) is defined by a lateral bore in the end wall 21 and is aligned with a bore in the flange 15 defining the passage 62' which intersects at its end a horizontal bore defining the passage 63. The passage 63 intersects at its inner end (Fig. 5) an axial bore in a thickened portion 76 of the cup-shaped portion 13 defining the passage 64. The outer ends of the passages 63 and 64 are sealed by plugs 77 and 78, respectively. A bore extending obliquely across the end of the cup-shaped head body portion 13 (direction indicated by the line 6—6 on Fig. 1) intersects a reduced end portion 79 of the piston chamber 25 and extends to the passage 64 near the plug 78 and defines the passage 65 (Figs. 5 and 6) which is sealed at its outer end by a plug 80.

The passage 71 with which the port 46 is aligned is an extension beyond the opening 33 of the lateral bore in the end wall 21 which defines the passage 62 and intersects a horizontal bore in the side wall 11 which defines the passage 70. The passage 70 intersects at its inner end an axial bore in a thickened portion 81 of the cup-shaped extension 19 defining the passage 69. The passages 69 and 70 are sealed at their outer ends by plugs 82 and 83, respectively. A bore extending obliquely across the end of the cup-shaped extension 19 intersects a reduced end portion 84 of the piston chamber 26 and extends to the passage 69 near the plug 83 and defines the passage 68 sealed at its outer end by a plug 85 (Fig. 6).

The piston 28, shown most clearly in Fig. 2, comprises opposed piston heads 86 and 87 coupled by a rack portion 89 of generally rectangular section having suitable teeth 90 cut in the top of a central portion of reduced width. The piston heads 86 and 87 are reciprocally supported in tubular linings 91 and 92, respectively, pressed into the piston chamber 25 and 26, respectively, and extending therefrom a short distance into the cubical chamber defined by the body 10. Each of the piston heads 86 and 87 has a suitable cup-shaped elastic sealing member 94 secured to the outer end face thereof as by a screw 95.

The piston 28 cooperates with the output shaft assembly 30 to drive the power output shaft 1 with an alternate rotary motion by virtue of the teeth 90 of the rack portion 89 meshing with a gear 96 suitably secured to a squared inner end 98 of the power output shaft 1 against a flange 99 (Fig. 3) integral with the shaft. The flange 99 serves to space the gear 96 from the inner end of the bushing 5 and absorbs outward axial thrust of the shaft 1 which is rotatably supported by the bushing 5. The bushing 5 is pressed into a central opening 101 in the short extension or pad 22 and is further secured in position by cap screws 102, only one of which is shown in Fig. 1, passing through openings in the flange 104 on opposite sides of the shank portion of the bushing 5 and received within threaded sockets in the pad 22. The outer face of the extension 22 is chamfered at the central opening 101 to provide space for a suitable sealing material 105, and a gasket 106 is interposed between the faces of the flange 104 and the extension 22.

The yoke mechanism 31 comprises a pivot block support 108, a pivot block 109, an adjusting screw 110, and the trip yoke 52. The support 108 is secured to the piston 28 by a hex nut 111 threaded on the end of a stud 112 extending outwardly from a tongue 114 on the support 108 and passing through an opening in a widened portion (see Fig. 5) of the rack portion 89 of the piston 28. The widened portion of the rack has a groove 116 which receives the tongue 114 and thus the support 108 becomes in effect an integral part of the piston 28 and moves transversely therewith.

A widened face portion of the support 108 opposite from the stud 112 has an elongated slot 118 in which the pivot block 109 is slidably mounted. The pivot block 109 is held in adjusted position within the slot 118 by virtue of its threaded engagement with the adjusting screw 110 which passes freely through the support 108 longitudinally of the slot 118 and has a head 110' at its lower end. By turning the screw 110 as by means of a screw driver received in a slot 119 at the top of the screw 110 the pivot block 109 can be raised or lowered to adjust in infinite steps the angular travel of the output shaft 1 in a manner to be described. A suitable lock nut 120 is provided at the top of the screw 110 to lock the screw in adjusted position, and access to the screw 110 and the nut 120 is enabled by removing a plug 121 threaded into an opening in the top wall of the body 10 directly above the screw 110 and provided with an annular sealing gasket 122.

A groove 124 in the face of the trip yoke 52 opposite the bearing pin 51 extends from the bottom substantially to the top of the yoke 52 and slidably receives a driving pin 125 integral with the pivot block 109, a bearing block 126 being interposed between the pin 125 and the groove 124 to minimize wear on the pin and groove. As can be seen most clearly in Figs. 3 and 4, rectilinear reciprocation of the piston 28 causes similar movement of the pivot block support 108 and the pivot block 109. As a result of this movement the driving pin 125 slides in the groove 124 and oscillates the yoke 52 about the center of the bearing pin 51 which is rotatably received in the inner counterbored portion of the opening 50 in the valve member 35 as previously described. The extent of oscillation of the yoke 52 with respect to the reciprocated position of the piston 28 is determined by the adjusted position of the pivot block 109 with respect to the axis of the bearing pin 51.

An arm 128 extending outwardly from the top of the trip yoke 52 in the direction of and parallel to the bearing pin 51 has a circular opening 128' therethrough which is chamfered at the lower face portion of the arm 128 to provide a seat for a hemi-spherical head 129 of a spring perch or retainer 130 which forms a part of the snap action mechanism 32. The head 129 extends part way into the opening 128' and has an upwardly extending pin portion 131 which serves to prevent the possibility of disengagement of the retainer 130 from the yoke 52.

A downwardly extending cylindrical shaft portion 132 of the spring retainer 130 is slidably received in a longitudinal bore of a trunnion block 134 which comprises a lower bar portion 135, an intermediate enlarged portion 136, and an upper reduced cylindrical portion 137. A pair of opposed bearing pin portions 138 (only one of which is shown Fig. 4) extending outwardly from the lower end of the bar portion 135 are substantially semi-circular in cross section and are received in respective complementary openings 139 in the legs of the bifurcated arm 36 of the valve member 35. Slots 140 open respectively into the openings 139 so that the pin portions 138 may be readily inserted into the openings 139 in one relatively turned position of the bifurcated arms and pins.

A coiled compression spring 142 surrounds the portion 137 of the trunnion 134 and bears against an annular shoulder defined by the portion 137 and the shoulder 136. The upper end of the spring 142 bears against a similar annular shoulder formed adjacent a lower reduced cylindrical portion 144 of the spring retainer 130.

A more complete understanding of the construction and cooperation of the various parts of the motor M may be had from the following description of operation. As stated previously: with the valve gate 35 in the turned position shown in the drawings, fluid under high pressure flows from the high pressure inlet conduit 6 through the passage 61, the port 45, the valve chamber 55, the port 44, and the passages 62 to 65, inclusive, into the piston chamber 25 and forces the piston 28 toward the right, as viewed in Fig. 4, left Fig. 2—the piston 28, however, being shown at the center of its path of travel. Concurrently, exhaust fluid flows from the piston chamber 26 through the passages 68 to 71, inclusive, the port 46, the valve chamber 56, the port 47, the passages 72 and 73, the interior of the body 10, the bores 51' and 50, and the chamber 54 into the low pressure outlet conduit 8. It should be noted (Fig. 3) that the end of the bore 51' which opens into the groove 124 is enlarged to provide a passage around the bearing block 126 when the pivot block 109 is in the lowermost adjusted position.

Due to the operative engagement between the teeth 90 of the rack portion 89 with the gear 96, this translatory movement of the piston 28 causes partial rotation of the shaft 1 and consequent wiping action of the wiper blade 3. Concurrently, and by virtue of the same translatory movement of the piston 28, the pivot block support 108 together with the pivot block 109 move to effect, due to operative engagement between the pin 125 and the slot 124, movement of the top of the trip yoke 52 (to the right, Fig. 4) in an arc the center of which is the axis of the bearing pin 51. Movement of the yoke 52 to the right compresses the spring 142 as the spring retainer 130 moves due to the cooperation between the head 129 and the opening 128' in the arm 128. Movement of the spring retainer 130 is about the trunnion pins 138 which turn in the openings 139. The yoke 52 moves until the snap action mechanism 32 is in its dead center position, and slight additional movement of the arm 128 permits the spring 142 to expand and drive the arm 49 and the valve gate 35 through an arc of substantially 60° to the position shown by dot and dash lines in Fig. 4.

Movement of the valve gate 35 into the 60° turned position permits high pressure fluid to flow through the passage 61, the port 45, the valve chamber 55, the port 46, and the passages 71, 70, 69 and 68 into the piston chamber 26 to arrest and reverse the movement of the piston 28. Concurrently fluid flows from the piston chamber 25 through the passages 65, 64, 63, 62' and 62, the port 44, the valve chamber 55, the port 47, the passages 72 and 73, the interior of the body 10, the bores 51' and 50, and the chamber 54 into the outlet conduit 8. Reverse movement of the piston 28 causes reverse movement of the pivot block support 108, pivot block 109, and yoke 52 and consequently the snap action mechanism 32 moves again through a dead center position beyond which the spring 142 turns the valve gate 35 to its initial position.

It is thus seen that the piston 28 is reciprocated as long as high pressure fluid is supplied to the conduit 6 and effects alternate rotary motion of the power output shaft 1 to effect wiping action of the blade 3.

The extent of movement of the piston 28 and consequently the sweep of the wiper blade 3 is determined by the adjusted position of the pivot block 109 which determines the amount of movement of the piston 28 before the snap action mechanism 32 is effective to turn the valve gate 35. As shown, the angular travel of the shaft 1 and the wiper blade 3 can be adjusted, by turning of the screw 110 to raise and lower the pivot block 109, through a range from a minimum of 40° to a maximum of 150°, the adjustment being in infinite steps. A wider range can be obtained by different proportioning of the parts, if desired.

We claim:

1. In a hydraulic motor having a power output shaft oscillatably driven by a piston reciprocating in a piston chamber in response to alternating movement of a single rotary valve gate member controlling the supply of fluid to said chamber, the combination including a swingable yoke mechanism driven by said piston and a snap action mechanism operatively interposed between said yoke mechanism and said valve gate member, a positive connection between said snap action mechanism and said valve gate mechanism operable upon movement of said piston beyond a predetermined position in either direction of movement positively to move said valve gate member rapidly from one extreme position to another extreme position with a snap action to control thereby the flow of fluid to said piston chamber and reverse periodically the direction of movement of said piston, and means enabling adjustment of said predetermined position without requiring disassembly of any of the cooperating parts of the snap action mechanism.

2. In a hydraulic motor having a power output shaft oscillatably driven with alternate rotary motion by a double ended piston reciprocating in opposed piston chambers in response to alternate operation of a rotary valve controlling the supply of fluid to and from said chambers selectively, a yoke mechanism including a rigid arm pivoted on the rotational axis of the valve and a spring toggle snap action mechanism connecting said yoke arm to the valve and including a rigid toggle arm secured to the rotary valve for turning movement only therewith and a spring toggle arm connecting the rigid toggle arm to the yoke arm whereby said mechanisms are operable upon movement of said piston beyond predetermined positions in opposite directions, respectively, to operate said valve mechanism from one position to another position with a snap action to change thereby the flow of fluid from one of said chambers to the other of said chambers and a spring encircling said spring toggle arm to operate said valve mechanism as the toggle passes dead center.

3. A hydraulic motor comprising a power output shaft, a pinion secured to said shaft, a double ended piston reciprocating in opposed piston chambers in response to alternate operation of a rotary valve controlling the supply of fluid to and from said chambers selectively, said piston having a rack portion operatively in mesh with said pinion, whereby said shaft is oscillated by reciprocation of said piston, a swingable yoke mechanism driven by said piston, means within said yoke mechanism for varying the effective operating length thereof, a snap action mechanism operatively interposed between said yoke mechanism and said valve member and operable upon movement of said piston beyond a predetermined position to operate said valve mechanism rapidly from one position of rest to another position of rest with a snap action to change thereby the flow of fluid from one of said chambers to the other of said chambers.

4. A hydraulic motor as in claim 3 characterized in that said snap action mechanism comprises a toggle mechanism one end of which is rotatably supported in a lever arm integral with said rotary valve and the other end of which terminates in a hemi-spherical section, and in that said yoke mechanism is provided with an arm having a circular opening cooperating with said hemi-spherical section.

5. In a fluid pressure motor having a reciprocating piston with opposed piston heads slidable in piston chambers respectively, in response to alternate operation of a valve gate controlling the supply of fluid to said chambers, a support attached to said piston, a longitudinally grooved or slotted swingable yoke rotatably supported at one end by said valve gate, a pivot block adjustably associated with said support and operatively engaging the groove or slot to cause alternate rotary motion of said yoke upon reciprocation of said piston, and a snap action mechanism operatively interposed between said yoke member and said valve gate to move said valve gate alternately from one position to another position with a snap action consequent upon alternate rotary motion of said yoke.

6. In a fluid pressure motor having a reciprocating piston with opposed piston heads slidable in piston chambers respectively in response to alternate operation of a valve member controlling the supply of fluid to said chambers, an elongated support member attached to said piston and having an adjusting screw, a longitudinally grooved or slotted trip yoke rotatably supported at one end by said valve member, a pivot block threaded on said screw and adjustable with respect to the said end of said trip yoke upon turning of said screw and operatively engaging the groove or a slot to cause alternate rotary motion of said trip yoke upon reciprocation of said piston, said valve member having two positions of movement, and a snap action mechanism interposed between said trip yoke and said valve member to move said valve member from one position to the other position with a snap action upon alternate rotary motion of said trip yoke.

7. In a fluid pressure motor, a reciprocating piston member having opposed piston heads slidable in piston chambers respectively in response to alternate operation of a rotary valve gate controlling the supply of fluid to said chambers, a guide member attached to said piston and with a guide surface extending transverse to the main longitudinal axis of the piston member, a slotted trip yoke rotatably supported at one end coaxially with said valve gate member, a pivot block movably associated with said yoke member on said guide surface and operatively engaging the slot of the trip yoke to cause alternate rotary motion of said trip yoke upon reciprocation of the piston member, means connecting the pivot block and guide member and turnable to adjust the block along said guide surface, said valve gate having two valving positions and a snap action mechanism interposed between said trip yoke and said valve gate to move said valve gate from one valving position to the other position with a snap action upon alternate rotary motion of said trip yoke.

COLUMBUS R. SACCHINI.
LORAIN N. VANDERVOORT.